United States Patent [19]

Kurokawa

[11] 4,432,620

[45] Feb. 21, 1984

[54] LENS MOTOR DRIVE DEVICE IN AUTOMATIC FOCUSING CAMERA

[75] Inventor: Hiroshi Kurokawa, Yokohama, Japan

[73] Assignee: Ricoh Co., Ltd., Tokyo, Japan

[21] Appl. No.: 356,318

[22] Filed: Mar. 9, 1982

[30] Foreign Application Priority Data

Mar. 13, 1981 [JP] Japan .................................. 56-36176
Mar. 13, 1981 [JP] Japan .................................. 56-36177

[51] Int. Cl.$^3$ .............................................. G03B 3/10
[52] U.S. Cl. ................................................... 354/402
[58] Field of Search .......................................... 354/25

[56] References Cited

U.S. PATENT DOCUMENTS 4,031,383  6/1977  Hosoe et al. ........................ 354/25 X
4,357,085  11/1982  Niwa et al. ............................ 354/25

Primary Examiner—Michael L. Gellner
Attorney, Agent, or Firm—Oblon, Fisher, Spivak, McClelland & Maier

[57] ABSTRACT

A lens motor drive in an automatic focusing camera, in which current corresponding to a degree of focalization of an optical system is supplied to a lens motor in which there is provided a signal forming circuit performing a focalization signal representing the focalization of the optical system, and a focalization deviation signal having a level corresponding to a degree of focalization of the optical system. In addition, there is provided a limiting circuit for providing an output when the level of said focalization signal decreases to an extent that the lens motor cannot continue rotation, and a timing circuit for providing an output when the limiting circuit provides the output for a predetermined period of time. A start pulse generating circuit is also provided for generating a start pulse having a duration long enough to start the lens motor when the output of the timing circuit is provided under the condition that there is an absence of the focalization signal.

3 Claims, 9 Drawing Figures

LENS MOTOR DRIVE DEVICE IN AUTOMATIC FOCUSING CAMERA

BACKGROUND OF THE INVENTION

This invention relates to a lens motor drive device in an automatic focusing camera.

Automatic focusing cameras employ a variety of lens driving systems. In one of the systems, the lens is moved back and forth by an electric motor which is called "a lens motor". The lens motor is, in general, controlled by a servo control system so that a large current is supplied to the motor when the lens is set away from the focalization point where the lens is focused on an object to be photographed, and the current is decreased as the lens approaches the focalization point.

Torque required for turning the lens, which is a load applied to the lens motor, depends on various conditions. For instance, the torque depends on where and how the lens extending mechanism stops. When the ambient temperature is decreased, the load resistance is increased, and therefore it is necessary to increase the torque. Furthermore, the required torque depends on whether the lens is turned in one direction or in the opposite direction.

However, a conventional lens motor drive control system is not so designed that it can follow up the above-described variations of the required torque. Therefore, in the case when the lens has been stopped near the focalization point and a small current is supplied to the lens motor from the lens motor drive control system, the lens motor may not be started. Since, as described above, the current supplied to the lens motor is decreased as the lens comes near the focalization point, the lens may not be driven by the torque of the lens motor. Thus, sometimes the lens motor is stopped although the lens is not brought to the focalization position yet.

SUMMARY OF THE INVENTION

Accordingly, an object of this invention is to provide a lens motor drive device in an automatic focusing camera, which operates to apply a large current to a lens motor at the start, so that the lens motor is positively started overcoming the load resistance.

Another object of the invention is to provide a lens motor drive device in an automatic focusing camera, in which whether or not the lens is focused on an object to be photographed a predetermined period of time after the lens comes near the focalization position and only a small current therefore flows in the lens motor, is detected, and if the lens is not focused on the object, a large current is caused to flow in the lens motor so as to drive the lens to the focalization position.

The foregoing objects and other objects of the invention has been achieved by the provision of a lens motor drive device in an automatic focusing camera, which controls the supply of current to a lens motor adapted to drive a lens in an optical system according to a focusing signal which is provided by detecting conditions of the optical system; which, according to the invention, comprises a circuit for forming, in response to an operation instruction from the camera, a start pulse with which current is supplied to the lens motor for a period of time which is long enough to start the lens motor, so that the lens motor is energized according to the start pulse at the start thereof.

The nature, principle and utility of the invention will become more apparent from the following detailed description when read in conjunction with the accompanying drawings.

DETAILED DESCRIPTION OF THE INVENTION

Figure 1:
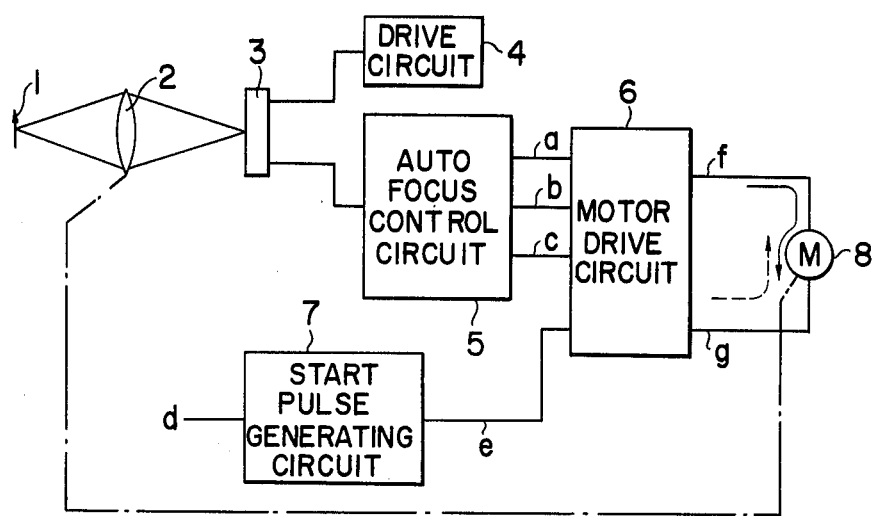
FIG. 1 is an explanatory diagram showing a first embodiment of this invention.

FIG. 1 shows one example of a lens motor drive device in an automatic focusing camera, according to one embodiment of this invention. As shown in FIG. 1, the image of an object 1 to be photographed is formed on the light receiving surface of a self-scanning type photo-electric element 3 by a lens 2. The photo-electric element 3 scans the image of the object in response to a control signal from a drive circuit 4, to form a light reception signal which is applied to an automatic focusing control circuit 5.

In response to the output signal of the photo-electric element 3, the automatic focusing control circuit 5 forms a front focus signal a or a rear focus signal c and a focalization deviation signal b which are applied to a motor drive circuit 6. The motor drive circuit 6 determines the polarity of current to be applied to an electric motor 8 according to the signal a or c, and determines the magnitude of the current according to the signal b. A start pulse generating circuit 7 forms a start signal e according to an AF operation instruction d from a camera circuit (not shown). The start signal e is applied to the motor drive circuit 6. In response to the start signal e, the motor drive circuit 6 allows a predetermined large current to flow in the motor 8.

Figure 2:
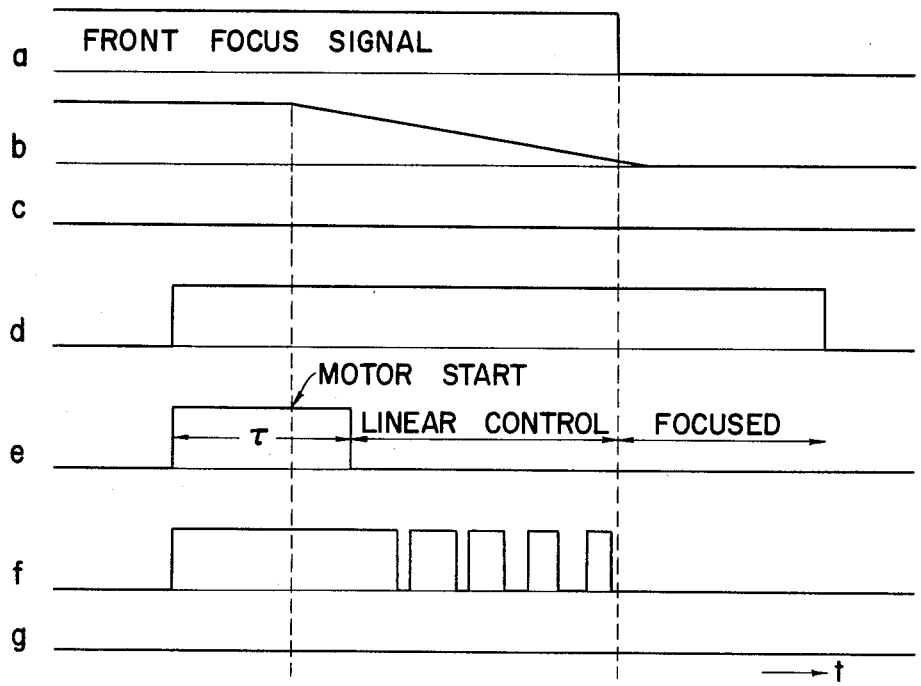
FIG. 2 is a time chart showing signals at various circuits in the first embodiment in FIG. 1.

The operation of the circuitry shown in FIG. 1 will be described with reference to FIG. 2 which is a time chart showing signals at various circuit elements in FIG. 1.

Let us consider the case where the camera operation begins with the lens 2 stopped at a front focus position. In this case the automatic focusing control circuit 5 produces only the front focus signal a and the focalization deviation signal b.

When, under this condition, the camera circuit (not shown) produces the AF operation instruction d, the start pulse generating circuit 7 generates the start pulse e which is applied to the motor drive circuit 6. The start pulse e rises with the AF operation instruction d and has a pulse duration τ which is long enough to start the lens motor 8.

In response to the start pulse e, the motor drive circuit 6 forms a voltage which is sustained for the pulse duration τ of the start pulse and is such that the average current value is thereafter decreased in response to a duty change, the voltage thus formed being applied to the lens motor. When the lens is moved from the front focus position, so as to be focused on the object, a voltage f outputted by the motor drive circuit 6 is positive, and a voltage g is zero, and therefore current as indicated by the solid line flows in the lens motor 8. When the lens reaches a focalization position, the automatic focusing control circuit 5 produces none of the front focus signal a, rear focus signal c and focalization deviation signal b, and the start pulse e from the start pulse generating circuit 7 disappears, as a result of which the operation of the motor drive circuit 6 is stopped.

In the case where the lens is moved from the rear focus position to the focalization position, instead of the front focus signal a the rear focus signal c is produced, and the voltage f is zero while the voltage g is positive. In this point, the case is different from the above-described case; however, the operation is similar to that in the above-described case.

According to the first embodiment of the invention shown in FIG. 1, at the start of the lens motor, a current large enough to start the motor is caused to flow therein. Accordingly, no matter where the lens is stopped or no matter how other conditions change, the lens motor can be positively started.

Figure 3:
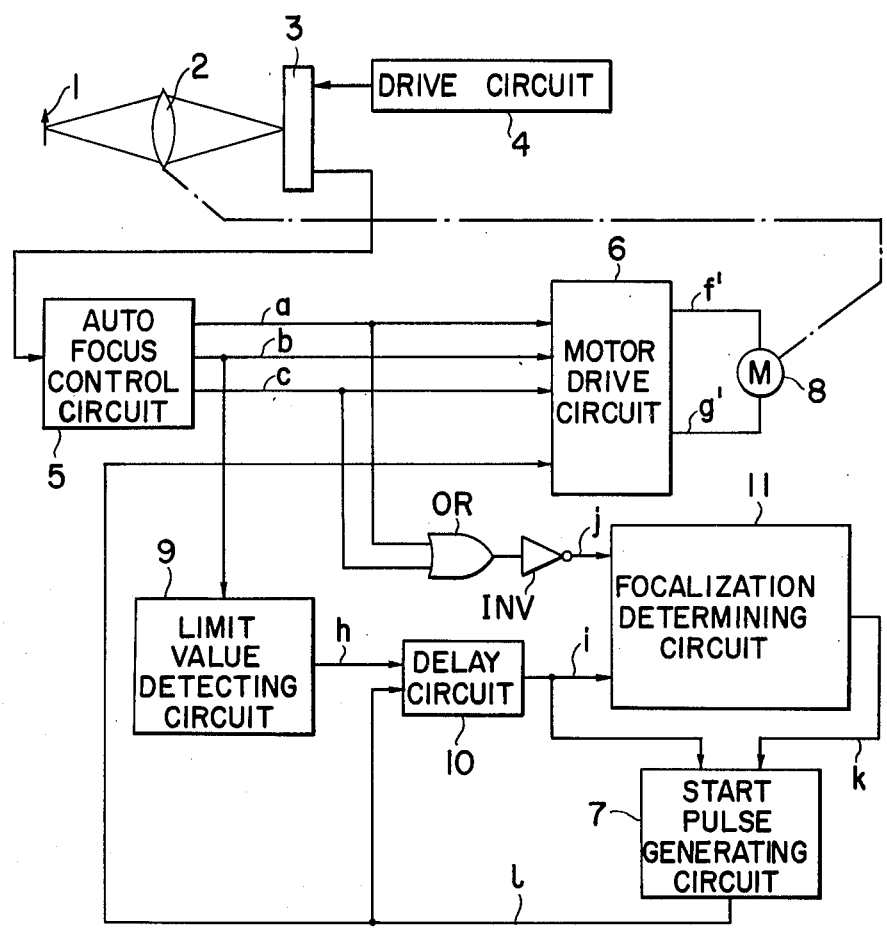
FIG. 3 is an explanatory diagram showing a second embodiment of the invention.

FIG. 3 shows a second embodiment of the invention. Similarly as in FIG. 1, the image of an object 1 is formed on the light receiving surface of a self-scanning type photo-electric element 3. The photo-electric element 3 scans the image of the object in response to a control signal from a drive circuit 4, to form a light reception signal which is applied to an automatic focusing control circuit 5.

According to the output signal of the photo-electric circuit 3, the automatic focusing control circuit 5 forms a front focus signal a or a rear focus signal c and a focalization deviation signal b. These signals a, b and c are applied to a motor drive circuit 6, to drive a lens motor 8. Furthermore, the front focus signal a and the rear focus signal c are applied through an OR gate OR and an inverter INV to a focalization determining circuit 11. The focalization deviation signal b is applied to a limit value detecting circuit 9, the output of which is applied to a delay circuit 10. The output of the delay circuit 10 operates the focalization determining circuit 11 and a start pulse generating circuit 7. As a result, the start pulse generating circuit 7 generates a start pulse which is applied to the motor drive circuit 6, so that the lens motor 8 is driven to move the lens to the focalization position. The delay circuit 10 provides the output when it receives the output from the limit value detecting circuit 9 for a predetermined period of time; that is, the delay circuit 10 operates as a timing circuit.

Figure 4:
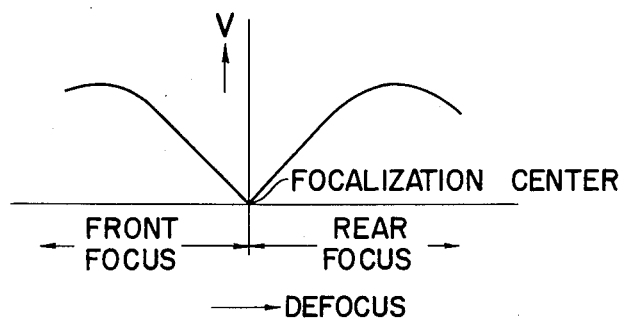
FIG. 4 is a characteristic diagram showing an input signal to an automatic focusing control circuit in the embodiment shown in FIG. 3.

FIG. 4 shows the signal which the automatic focusing control circuit 5 receives from the self-scanning type photo-electric element 3 in order to form the front focus signal a or the near focus signal c and the focalization deviation signal b. In FIG. 4, the horizontal axis represents the amount of defocus, i.e., the amount of movement of the lens from the focalization point, while the vertical axis represents the voltage V which is representative of the degree of focalization. As is apparent from FIG. 4, the characteristic curve of the signal is substantially V-shaped. The front focus signal formed according to the signal is raised to a high level (hereinafter referred to merely as "H", when applicable) in the front focus region which is extended from the focalization point to the left-hand, and the rear focus signal c is raised to "H" in the rear focus region which is extended from the focalization point to the right-hand. The value of the focalization deviation signal b varies with the amount of defocus, similarly as in the above-described voltage V.

Figure 5:
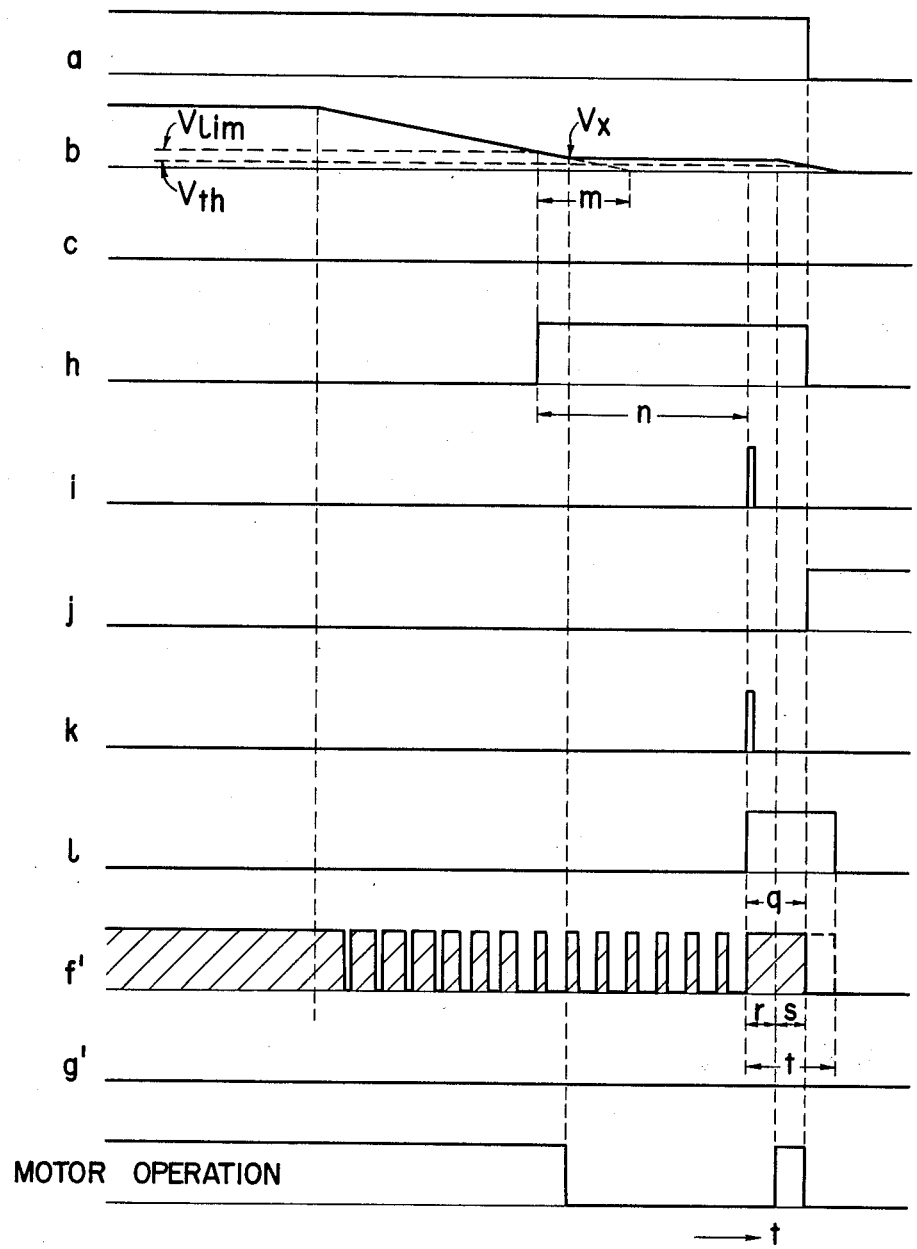
FIG. 5 is a time chart showing signals at various circuits in the embodiment in FIG. 3.

FIG. 5 shows the waveforms of these three signals a, b and c and of signals in various circuits in FIG. 3. The operation of the circuitry in FIG. 3 will be described with reference to FIG. 5.

In the case where the camera operation is started with the lens 2 at the front focus position, the automatic focusing control circuit 5 produces only the front focus signal a and the focalization deviation signal b (the rear focus signal c being not produced).

When, under this condition, the power switch is turned on, the motor drive circuit 6 applies a positive voltage f' and a zero voltage g' to the lens motor 8 so as to move the lens 2 to the focalization position. As the lens 2 approaches the focalization position, the value of the focalization deviation signal b decreases while the output f' of the motor drive circuit 6 includes a voltage zero period. The time ratio of the voltages V and O of the output f', i.e., the duty decreases gradually as the focalization deviation signal b decreases. When the value of the focalization deviation signal b reaches a value Vx, the resistance of the lens overcomes the torque of the lens motor, as a result of which the lens is stopped.

A value Vlim which is slightly larger than the value Vx is set as a limit value, so that when the focalization deviation signal b decreases to the limit value Vlim, the limit value detecting circuit 9 provides an output h which is applied to the delay circuit 10. The delay circuit 10 produces an output i when it receives the input h for a predetermined period of time n. The output i is applied to a focalization determining circuit 11 and the start pulse generating circuit 7. When the focalization determining circuit 11 receives the signal i and the lens does not reaches the focalization position yet, the focalization determining circuit 11 produces an output k under the condition that the signal j is at a zero level (hereinafter referred to merely as "O", when applicable). The signal k is applied to the start pulse generating circuit 7. Upon reception of the output i from the delay circuit 10 and the output k from the focalization determining circuit 11, the start pulse generating circuit 7 outputs a start pulse l which is applied to the motor drive circuit 6 and the delay circuit 10. The duration of the start pulse l is set to a value t with which the lens motor can be sufficiently started. Upon reception of the start pulse l, the motor drive circuit 6 starts to apply voltage to the lens motor 8. If the lens motor is started when the voltage f' is applied to the lens motor for a period of time r, the focalization deviation signal b decreases again thereafter. When the value of the focalization deviation signal b decreases to the operation threshold value Vth of the OR gate OR and inverter INV, the output j of the inverter INV is raised to "H", and thereafter the output k of the focalization determining circuit 11 is maintained at "O". Accordingly, the start pulse generating circuit 7 outputs another signal l. In this case, as the focalization deviation signal b has decreased to the threshold value Vth or lower, the motor drive circuit 6 outputs no voltage f'.

In other words, when the start pulse l is produced, the lens motor 8 is energized for the first part r of the duration t of the start pulse l, so that the lens motor 8 is started, and the lens motor 8 is rotated for a period of time s and is then stopped. That is, in this case, the start pulse l as the pulse duration t; however, the lens motor 8 is energized actually for a period of time q ($=r+s$) and is rotated for the period of time s.

In the case when the load resistance of the lens motor is increased for some reason and accordingly the lens motor is not started with one start pulse l, the delay circuit 10 produces the output i again the period of time n after reception of the start pulse, as a result of which the focalization determining circuit 11 and the start pulse generating circuit 7 is operated again, to provide a start pulse l. This operation is continued until the focalization deviation signal b reaches the threshold value Vth, i.e., the lens reaches the focalization position.

Figure 6:
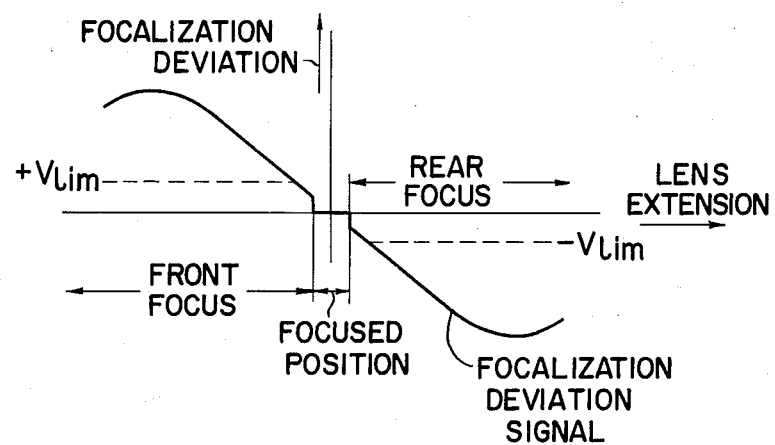
FIG. 6 is a diagram showing another example of the output signal of the automatic focusing control circuit in FIG. 3.

FIG. 6 shows a signal which is outputted in place of the front focus signal a, rear focus signal c and focalization deviation signal b (shown in FIG. 5) by the automatic focusing control circuit 5. In this case, the characteristic curve of the signal is of one line. As the signal is so processed by the automatic focusing control circuit 5 that the amount of focalization deviation near the focalization point is at a zero level, the range of focalization is increased. Therefore, the operation of the control system is stabler than that in the case of employing the signals a, b and c (FIG. 5).

However, in this case, it is necesary for the limit value detecting circuit 9 to detect limit values $+V_{lim}$ and $-V_{lim}$. Accordingly, the limit value detecting circuit 9 in ths case should be such that the minus polarity part of the focalization deviation signal is inverted its polarity to obtain the solute value thereof so that the signal has a waveform as shown in FIG. 4, having the zero level near the focalization point. Furthermore, in this case, it is necessary that the motor drive circuit 6 form signals corresponding to the front focus signal a, the rear focus signal c and the focalization deviation signal b shown in FIG. 5.

Figure 7:
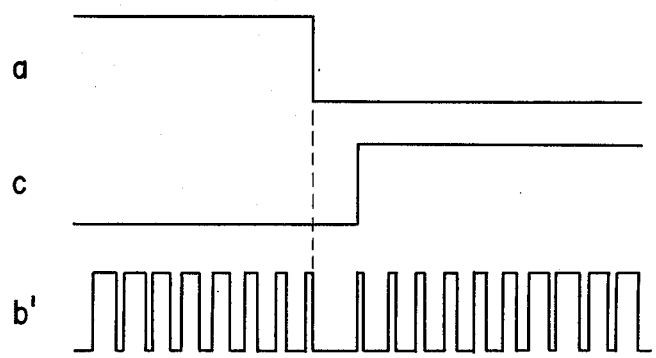
FIG. 7 is a diagram showing another example of the output signal of the automatic focusing control circuit in FIG. 3.

FIG. 7 shows another example of the focalization deviation signal. In FIG. 7, the degree of focalization is represented by a pulse duty instead of a voltage level. Accordingly, in this case, the automatic focusing control circuit 5 should be so designed as to output the focalization deviation signal according to the variations of the pulse duty, and in association with this design the limit value detecting circuit 9 should be so designed as to detect the variations of the pulse duty.

Figure 8:
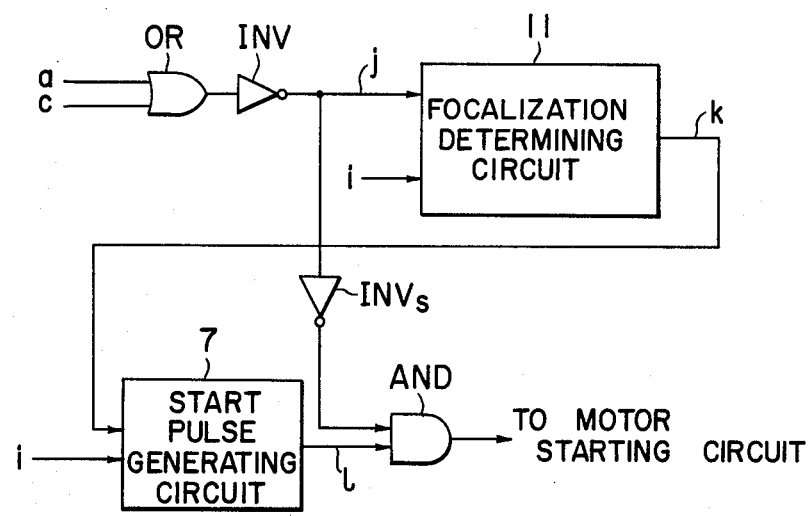
FIG. 8 is a diagram showing a third embodiment of the invention.

FIG. 8 shows another example of the mutual connection of the focalization determining circuit 11 and the start pulse generating circuit 7. The input j to the focalization determining circuit 11 is applied through an inverter INVs to one of the input terminals of an AND gate AND, to the other input terminal of which the start pulse l is applied from the start pulse generating circuit 7. The output of the AND gate AND is applied to the motor drive circuit 6.

Figure 9:
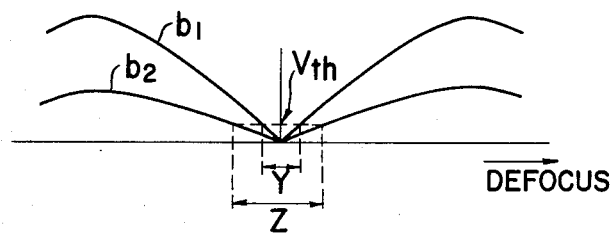
FIG. 9 is a characteristic diagram in the case where a focalization deviation signal from the automatic focusing control circuit changes moderately.

FIG. 9 shows characteristic curves for a description of the fact that, when the focalization deviation signal becomes moderate in voltage level change, decrease of the focalization accuracy should be prevented. It is assumed that, when a focalization deviation signal $b_1$ is produced in an ordinary photographing operation, a focalization deviation signal $b_2$ is produced under special photographing conditions. In the case where the focalization is detected from the signal $b_2$ by referring to the threshold value Vth, the range of focalization is as indicated by reference character z. That is, the range of focalization z is wider than that y in the case of the signal $b_1$, i.e., the focalization accuracy with the signal $b_2$ is lower.

This drawback can be eliminated by increasing the motor energization time according to the start pulse l as indicated by the broken line in the signal f' in FIG. 5. That is, the focalization accuracy can be improved by employing a method in which, even when the focalization is determined as a result of the detection with the threshold value Vth, the lens motor is further rotated and the energization of the motor is suspended at the end of the start pulse l.

In the above-described embodiment, since the automatic focusing control circuit 5 outputs the front focus signal a, the rear focus signal c and the focalization deviation signal b, the OR gate OR and the inverter INV are employed to form the focalization signal j from the front focus signal a or the rear focus signal c. However, the OR gate and the inverter may be eliminated if the automatic focusing control circuit 5 is so designed as to output the focalization signal.

The output of the delay circuit 10 is applied to the focalization determining circuit 11 and the start pulse generating circuit 7; however, the latter 11 and 7 may have their own delay circuits, respectively.

Furthermore, the signal i applied to the start pulse generating circuit 7 by the delay circuit 10 may be eliminated if the focalization determining circuit 11 is suitably designed.

It goes without saying that the circuits which are formed for processing the above-described signals a, b and c are changed in arrangement if the contents of the signals a, b and c are changed, as was described above.

According to the circuitry shown in FIG. 3, when the focalization is not obtained within the predetermined time after the lens has approached the focalization point, a large current is caused to flow in the lens motor, so that the lens is moved to the focalization position. Therefore, the trouble that the lens motor is stopped and accordingly the photographing operation cannot be achieved, can be positively prevented.

What is claimed is:

1. A lens motor drive device in an autonmtic focusing camera, in which current corresponding to a degree of focalization of an optical system is supplied to a lens motor to drive a lens in said optical system; when device comprises:

a signal forming circuit for forming a focalization signal representing the focalization of said optical system, and a focalization deviation signal having a level corresponding to a degree of focalization of said optical system;

a limit value detecting circuit for providing an output when the level of said focalization deviation signal decreases to an extent that said lens motor cannot continue rotation;

a timing circuit for providing an output when said limit value detecting circuit provides the output for a predetermined period of time; and a start pulse generating circuit for generating a start pulse having a duration long enough to start said lens motor when the output of said timing circuit is provided under the condition that the focalization signal is not provided, so that current is supplied to said lens motor according to said start pulse.

2. A device as claimed in claim 1, in which
said signal forming circuit forms said focalization signal according to said output of said timing circuit, and
said start pulse generating circuit forms said start pulse according only to the output of said focalization signal forming circuit.

3. A device as claimed in claim 1 or 2, in which the supply of current to said lens motor is controlled according to pulse duty variations.

* * * * *